Figure 1:
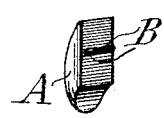

No. 785,715. PATENTED MAR. 28, 1905.
F. A. J. COURNAND.
MANUFACTURE OF ARTIFICIAL TEETH OR THE LIKE.
APPLICATION FILED APR. 22, 1904.

Alloy of Iron & Nickel

B Alloy
C Platinum

WITNESSES:
Fred White
René Bruine

INVENTOR:
Frédéric Adolphe Jules Cournand,
By his Attorneys
Arthur E. Frasur

No. 785,715. Patented March 28, 1905.

UNITED STATES PATENT OFFICE.

FRÉDÉRIC ADOLPHE JULES COURNAND, OF PARIS, FRANCE, ASSIGNOR TO STE. AME. DE COMMENTRY-FOURCHAMBAULT ET DECAZÉVILLE, OF PARIS, FRANCE.

MANUFACTURE OF ARTIFICIAL TEETH OR THE LIKE.

SPECIFICATION forming part of Letters Patent No. 785,715, dated March 28, 1905.

Application filed April 22, 1904. Serial No. 204,368.

*To all whom it may concern:*

Be it known that I, FRÉDÉRIC ADOLPHE JULES COURNAND, a citizen of the Republic of France, residing in Paris, France, have invented certain new and useful Improvements Relating to the Manufacture of Artificial Teeth or the Like, of which the following is a specification.

This invention has for its object applications to the dental art—that is to say, to the manufacture of artificial teeth having a fastening wire or rod composed of an alloy of iron and nickel capable of being incorporated in glass or porcelain without fracturing it.

It has not hitherto been found possible to incorporate with perfect adherence in glass or porcelain by means of a fusion or simply by softening the ceramic material metals other than platinum or certain special alloys having a base of iron and of nickel. Experiments have proved that the application of such alloys may be considerably extended and in particular the incorporation of them in porcelain for the manufacture of artificial teeth.

It is well known that artificial teeth are constituted by molded pieces of hard porcelain in which one or more platinum wires are ordinarily incorporated, which enable them to be fixed either upon artificial palates or in the root of the natural teeth, and which the dentist cuts or saws in such a manner that they come flush with the gums or in any other manner. All metals other than platinum present difficulties in manufacturing arising either from the fact that the melting-point of these metals is too high or because their expansion is greater than that of porcelain, so that after the contraction or cooling of the metal there remains a vacant space between the metal and the material of which the tooth is composed, whereby fracture of the metal pin or rod is frequently caused. It is true that it has been found possible to overcome this difficulty to some extent by fixing by means of baking one or more small rings of platinum, each of which occupies the bottom of a hole in which is engaged a metal pin which is fixed by means of the metallic soldering to the platinum ring. The pin remains free in the passage, and it is connected to the tooth only by the extremity soldered to the inner platinum ring. A pin thus fixed to a platinum ring adapted to the bottom of the hole does not, however, present the necessary fixity or strength. The tooth or the like which forms the subject of this invention gives better results and has incorporated in it a metal other than platinum, this metal having practically the same coefficient of expansion as porcelain. The metal employed is an alloy of iron and nickel, the proportion of nickel varying between forty and fifty per cent., in accordance with the expansibility of the porcelain with which it is to be combined. This alloy is not necessarily constituted by pure iron and nickel. It is an industrial and metallurgical alloy adapted to contain small quantities of foreign metals, such as chromium, manganese, cobalt, tungsten, or metalloids such as silicium or carbon. These wires may be incorporated directly in readily-fusible porcelains. If, however, the teeth are constituted by hard porcelain, wires composed of the alloys the composition of which has been indicated above would be deteriorated during baking. In order to arrange and fix them in the porcelain, the following or any other suitable methods may be therefore employed. One method consists in covering the wire of alloy of iron and nickel with a very thin tube of platinum, which is drawn with it and is perfectly adherent. This composite wire being engaged in the porcelain tooth, this latter may be baked in the ordinary manner and under the same conditions as if the wire were wholly of platinum, without the core of wire in iron and nickel alloy being deteriorated by the high temperature. In accordance with another method the teeth baked separately are provided with as many cavities as they are to contain wires. The wires of the improved alloy are then placed in these cavities and fixed by means of a suitable enamel or composition, which is fused and which adheres both to the metal wire and to the porcelain. During this operation of fusing the enamel it is well to protect the outer wire by a sheath of glass, porcelain, enamel, or other substance capable of preventing oxidation of the alloy. This sheath or coating is removed subsequently from that portion of the wire which is external to the tooth, baring the iron and nickel alloy wire to where it comes flush with the tooth.

These same alloys of iron and nickel may be employed for the manufacture of the plates employed in the dental art and which are intended to be covered with enamel and serve as false palates or as supports for artificial teeth in the same conditions as false palates of gold, platinum, gutta-percha, or the like.

The invention includes teeth having either a single wire or a plurality of wires.

The drawings herewith illustrate examples of teeth embodying the invention.

Figure 2:
Figure 3:
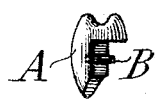
Figure 4:
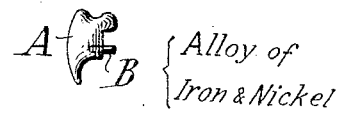
Figure 5:
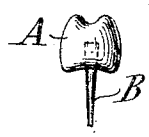
Figure 6:
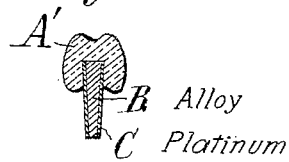

Figures 1 and 2 are respectively a perspective view and a side elevation of artificial teeth to be applied to the faces of worn teeth. Figs. 3 and 4 are respectively a perspective view and a side elevation of a similar artificial tooth for covering the face and edge of an old tooth. Fig. 5 is an elevation of a complete pivot-tooth. Fig. 6 is a cross-section of a similar tooth with a different pivot.

Referring to the drawings, A represents the artificial tooth or portion of a tooth in which is embedded one or more wires B for fixing it in place. The wire B, as stated, is embedded in the readily-fusible porcelain of the artificial tooth, which is baked with the wire in it. Where a hard porcelain is used, requiring a high baking temperature, such as is indicated at A' in Fig. 6, the wire B is protected by a surrounding thin tube C of platinum.

What I claim, and desire to secure by Letters Patent of the United States, is—

1. An artificial tooth having partially incorporated therein a wire for fixing it to its supports, said wire being an alloy of iron and nickel having substantially the same coefficient of expansion as the material of which the tooth is made, said material being fusible only at a high temperature and said wire having a protecting-coating.

2. An artificial tooth having partially incorporated therein a wire for fixing it to its supports, said wire being an alloy of iron and nickel having substantially the same coefficient of expansion as the material of which the tooth is made, said material being fusible only at a high temperature and said wire having a protecting-coating of platinum.

In witness whereof I have hereunto signed my name in the presence of two subscribing witnesses.

FRÉDÉRIC ADOLPHE JULES COURNAND.

Witnesses:
    MARCEL ARMENGAUD, Jeune,
    HANSON C. COXE.